United States Patent
Mantor et al.

(10) Patent No.: US 11,386,518 B2
(45) Date of Patent: Jul. 12, 2022

(54) EXCEPTION HANDLER FOR SAMPLING DRAW DISPATCH IDENTIFIERS

(71) Applicant: ADVANCED MICRO DEVICES, INC., Santa Clara, CA (US)

(72) Inventors: Michael Mantor, Orlando, FL (US); Alexander Fuad Ashkar, Orlando, FL (US); Randy Ramsey, Orlando, FL (US); Mangesh P. Nijasure, Orlando, FL (US); Brian Emberling, Santa Clara, CA (US)

(73) Assignee: ADVANCED MICRO DEVICES, INC., Santa Clara, CA (US)

( * ) Notice: Subject to any disclaimer, the term of this patent is extended or adjusted under 35 U.S.C. 154(b) by 0 days.

(21) Appl. No.: 16/580,654

(22) Filed: Sep. 24, 2019

(65) Prior Publication Data

US 2021/0090205 A1 Mar. 25, 2021

(51) Int. Cl.
*G06T 15/00* (2011.01)
*G06T 1/20* (2006.01)
*G06F 9/38* (2018.01)
*G06T 15/80* (2011.01)

(52) U.S. Cl.
CPC .............. *G06T 1/20* (2013.01); *G06F 9/3861* (2013.01); *G06T 15/80* (2013.01)

(58) Field of Classification Search
CPC .... G06F 9/4812; G06F 9/3861; G06F 9/4881; G06F 3/121; G06F 7/499; G06F 7/49905; G06F 11/00; G06F 11/0793; G06T 1/20; G06T 15/80; G06T 1/60
See application file for complete search history.

(56) References Cited

U.S. PATENT DOCUMENTS

| | | | |
|---|---|---|---|
| 2012/0200579 A1* | 8/2012 | Hartog | G06F 9/4812 345/503 |
| 2014/0176577 A1* | 6/2014 | Meixner | G06T 1/20 345/506 |
| 2014/0362102 A1 | 12/2014 | Cerny et al. | |
| 2016/0092382 A1 | 3/2016 | Anvin et al. | |
| 2017/0004005 A1 | 1/2017 | Elliott et al. | |
| 2017/0358129 A1* | 12/2017 | Chen | G06F 9/30014 |
| 2019/0004980 A1 | 1/2019 | Maor | |
| 2019/0042410 A1* | 2/2019 | Gould | G06F 12/0646 |

OTHER PUBLICATIONS

International Preliminary Report on Patentability dated Apr. 7, 2022 in Application No. PCT/US2020/052224, 7 pages.
International Search Report and Written Opinion dated Jan. 12, 2021 in Application No. PCT/US2020/052224, 11 pages.

* cited by examiner

*Primary Examiner* — Hau H Nguyen

(57) ABSTRACT

The address of the draw or dispatch packet responsible for creating an exception is tied to a shader/wavefront back to the draw command from which it originated. In various embodiments, a method of operating a graphics pipeline and exception handling includes receiving, at a command processor of a graphics processing unit (GPU), an exception signal indicating an occurrence of a pipeline exception at a shader stage of a graphics pipeline. The shader stage generates an exception signal in response to a pipeline exception and transmits the exception signal to the command processor. The command processor determines, based on the exception signal, an address of a command packet responsible for the occurrence of the pipeline exception.

20 Claims, 4 Drawing Sheets

# EXCEPTION HANDLER FOR SAMPLING DRAW DISPATCH IDENTIFIERS

BACKGROUND

Graphics processing devices may be implemented to carry out a variety of image processing or other general-purpose processing applications. For example, a graphics processing unit (GPU, sometimes referred to as a general-purpose graphics processing unit) often executes applications that benefit from a high degree of parallelism. In general, GPUs are designed to process a series of instructions, which may be referred to as shader instructions, using one or more shader processors residing in the GPU. In an example image processing application, shader instructions define one or more mathematical operations to be performed by the shader processors on pixels that make up an image. By applying a shader instruction to a pixel, the pixel value is changed or evaluated according to the mathematical operation defined by the shader instruction. Shader instructions are organized into shader program code known as a kernel, which defines a function or task that is performed by the GPU. In order to execute a kernel, the program code is divided into work items (e.g., a basic unit of work in a GPU).

BRIEF DESCRIPTION OF THE DRAWINGS

The present disclosure may be better understood, and its numerous features and advantages made apparent to those skilled in the art by referencing the accompanying drawings. The use of the same reference symbols in different drawings indicates similar or identical items.

DETAILED DESCRIPTION

To perform graphics processing, a central processing unit (CPU) of a system often issues to a GPU a call, such as a draw call or a dispatch call, which includes a series of commands instructing the GPU to draw an object according to the CPU's instructions. As the draw call is processed through the GPU graphics pipeline, exceptions sometimes occur in the graphics pipeline due to hangs, crashes, faults, and the like. Current implementations lack a mechanism to identify the source of a draw or dispatch, the corresponding pipeline shader where the exception occurred, where a wavefront came from in that shader, and the command buffer that issued the draw or dispatch to that shader. Current error reporting merely informs of the occurrence of a hang but does not provide any details regarding where in source code the hang came from (i.e., event reporting rather than diagnosis).

To expedite faster debug operations, FIGS. 1-4 illustrate systems and methods for sampling the address of the draw or dispatch packet responsible for creating an exception by tying a shader/wavefront back to the draw command from which it originated. In various embodiments, a method of operating a graphics pipeline and exception handling includes receiving, at a command processor of a graphics processing unit (GPU), an exception signal indicating an occurrence of a pipeline exception at a shader stage of a graphics pipeline. The shader stage generates an exception signal in response to a pipeline exception and transmits the exception signal to the command processor. The command processor determines, based on the exception signal, an address of a command packet responsible for the occurrence of the pipeline exception. In some embodiments, the exception signal is received at an exception handler of the command processor. In some embodiments, the command processor stores, at a ring buffer, an address associated with each draw or dispatch submitted to the graphics pipeline. Further, the command processor processes a header of the command packet in a command stream submitted to the GPU and advances, for each storing of the address associated with each draw or dispatch, a write pointer of the ring buffer. A read pointer of the ring buffer is advanced after wavefronts associated with each draw or dispatch complete processing through the graphics pipeline. In this manner, the command processor performs fine level logging of packet addresses and allows the shader, in the event of an exception/hang, to track which draw created the fault by going back all the way to the user submission of work to the GPU.

Figure 1:
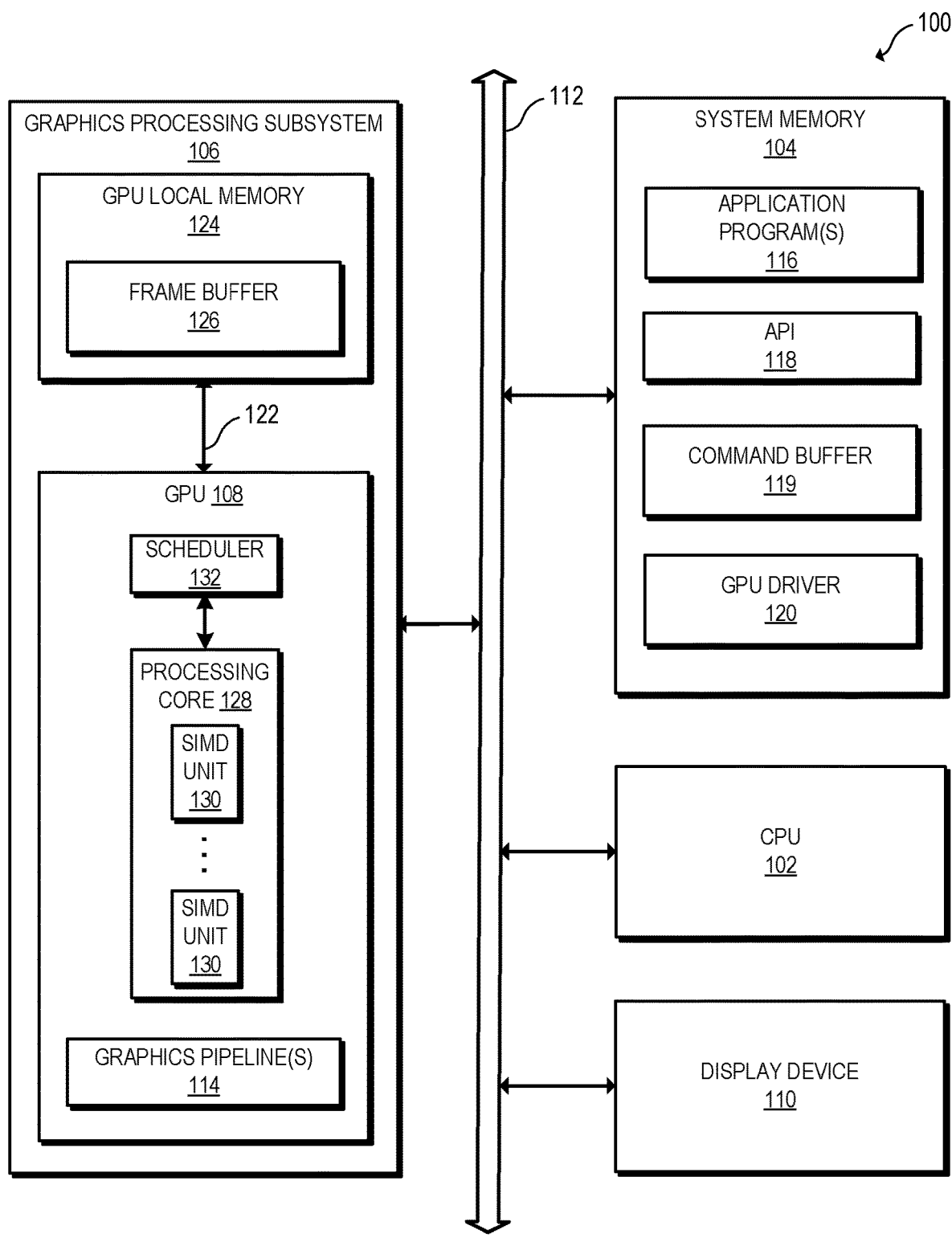
FIG. 1 is block diagram illustrating a processing system for implementing wavefront exception handling in accordance with some embodiments.

FIG. 1 is a block diagram of a processing system 100 for implementing wavefront exception handling in accordance with some embodiments. The computing system 100 includes a central processing unit (CPU) 102, a system memory 104, a graphics processing device 106 including a graphics processing unit (GPU) 108, and a display device 110 communicably coupled together by a system data bus 112. As shown, the system data bus 112 connects the CPU 102, the system memory 104, and the graphics processing device 106. In other embodiments, the system memory 104 connects directly to the CPU 102. In some embodiments, the CPU 102, portions of the graphics processing device 106, the system data bus 112, or any combination thereof, may be integrated into a single processing unit. Further, the functionality of the graphics processing device 106 may be included in a chipset or in some other type of special purpose processing unit or co-processor.

The CPU 102 executes programming instructions stored in the system memory 104, operates on data stored in the system memory 104, sends instructions and/or data (e.g., work or tasks to complete) to the graphics processing unit 108 to complete, and configures portions of the graphics processing device 106 for the GPU 108 to complete the work. In some embodiments, the system memory 104 includes dynamic random access memory (DRAM) for storing programming instructions and data for processing by the CPU 102 and the graphics processing device 106.

In various embodiments, the CPU 102 sends instructions intended for processing at the GPU 108 to a command buffer 119. In the illustrated embodiment, the command buffer 119 is located at system memory 104 coupled to the bus 112 (e.g., system memory 104). In other embodiments, the CPU 102 sends graphics commands intended for the GPU 108 to a separate memory communicably coupled to the bus 112. The command buffer temporarily stores a stream of graphics commands that include input to the GPU 108. In other embodiments, the command buffer 119 is an indirect buffer (IB) that stores graphics commands separate from an overall command buffer (not shown) employed by the CPU 102. The use of an indirect buffer allows the GPU 108 to process graphics commands, and generate and store data for other graphics commands, while the CPU 102 performs other operations.

The stream of graphics commands includes, for example, one or more command packets and/or one or more state update packets. In some embodiments, a command packet includes a draw command (also interchangeably referred to as a "draw call") instructing the GPU 108 to execute processes on image data to be output for display. For example, in some situations, a draw command instructs the GPU 108 to render pixels defined by a group of one or more vertices (e.g., defined in a vertex buffer) stored in memory. The geometry defined by the group of one or more vertices corresponds, in some embodiments, to a plurality of primitives to be rendered. Each draw command is associated with an address that identifies, for example, where the draw command is stored at the command buffer 119, and where the draw command is located in a program flow of a set of instructions executed by the CPU 102. The address of the draw command thus provides an identifier for the draw command for debugging and other operations, as described further herein.

The GPU 108 receives and processes work transmitted from the CPU 102. For example, in various embodiments, the GPU 108 processes the work to render and display graphics images on the display device 110, such as by using one or more graphics pipelines 114. The graphics pipeline 114 includes fixed function stages and programmable shader stages. The fixed function stages include typical hardware stages included in a fixed function pipeline of a GPU. The programmable shader stages include streaming multiprocessors. Each of the streaming multiprocessors is capable of executing a relatively large number of threads concurrently. Further, each of the streaming multiprocessors is programmable to execute processing tasks relating to a wide variety of applications, including but not limited to linear and nonlinear data transforms, filtering of video and/or audio data, modeling operations (e.g., applying of physics to determine position, velocity, and other attributes of objects), and so on. In other embodiments, the graphics processing device 106 is used for non-graphics processing.

As also shown, the system memory 104 includes an application program 116 (e.g., an operating system or other application), an application programming interface (API) 118, and a GPU driver 120. The application program 116 generates calls to the API 118 for producing a desired set of results, typically in the form of a sequence of graphics images. The graphics processing device 106 includes a GPU data bus 122 that communicably couples the GPU 108 to a GPU local memory 124. In various embodiments, the GPU 108 uses GPU local memory 124 and system memory 104, in any combination, for memory operations. The CPU 102 allocates portions of these memories for the GPU 108 to execute work. For example, in various embodiments, the GPU 108 receives instructions from the CPU 102, processes the instructions to render graphics data and images, and stores images in the GPU local memory 124. Subsequently, the GPU 108 displays graphics images stored in the GPU local memory 124 on the display device 110. The GPU local memory 124 stores data and programming used by the GPU 108. As illustrated in FIG. 1, the GPU local memory 124 includes a frame buffer 126 that stores data for driving the display device 110.

In various embodiments, the GPU 108 includes one or more compute units, such as one or more processing cores 128 that include one or more processing units 130 that executes a thread concurrently with execution of other threads in a wavefront, such as according to a single-instruction, multiple-data (SIMD) execution model. The processing units 130 are also interchangeably referred to as SIMD units. The SIMD execution model is one in which multiple processing elements share a single program control flow unit and program counter and thus execute the same program but are able to execute that program with different data. The processing cores 128 of the GPU 108 are also interchangeably referred to as shader cores or streaming multi-processors (SMXs). The number of processing cores 128 that are implemented in the GPU 108 is a matter of design choice.

Each of the one or more processing cores 128 executes a respective instantiation of a particular work-item to process incoming data, where the basic unit of execution in the one or more processing cores 122 is a work-item (e.g., a thread). Each work-item represents a single instantiation of, for example, a collection of parallel executions of a kernel invoked on a device by a command that is to be executed in parallel. A work-item is executed by one or more processing elements as part of a work-group executing at a processing core 128. In various embodiments, the GPU 108 issues and executes work-items including groups of threads executed simultaneously as a "wavefront" on a single processing unit 130. Multiple wavefronts are included in a "workgroup," which includes a collection of work-items designated to execute the same program. A workgroup is executed by executing each of the wavefronts that make up the workgroup. In some embodiments, the wavefronts are executed sequentially on a single processing unit 130 or partially or fully in parallel on different SIMD units. In other embodiments, all wavefronts from a workgroup are processed at the same processing core 128. Wavefronts are interchangeably referred to as warps, vectors, or threads.

In some embodiments, wavefronts include instances of parallel execution of a shader program, where each wavefront includes multiple work-items that execute simultaneously on a single processing unit 130 in line with the SIMD paradigm (e.g., one instruction control unit executing the same stream of instructions with multiple data). A scheduler 132 performs operations related to scheduling various wavefronts on different processing cores 128 and processing units 130, as well as performing other operations for orchestrating various tasks on the graphics processing subsystem 106. In some embodiments, the GPU 108 assigns an identifier (ID) to each wavefront to differentiate each wavefront from others.

The parallelism afforded by the one or more processing cores 128 is suitable for graphics related operations such as pixel value calculations, vertex transformations, tessellation, geometry shading operations, and other graphics operations. The graphics pipeline 114 accepts graphics processing commands from the CPU 102 and thus provides computation tasks to the one or more processing cores 128 for execution in parallel. In some embodiments, the CPU 102 provides the commands in the form of command packets that, as they are provided in sequence, form a command stream. Each command packet includes a header identifying the command, the commands location in the command stream, and other control information. Some graphics pipeline operations, such as pixel processing and other parallel computation operations, require that the same command stream or compute kernel be performed on streams or collections of input data elements. Respective instantiations of the same compute kernel are executed concurrently on multiple processing units 130 in the one or more processing cores 128 in order to process such data elements in parallel. As referred to herein, for example, a compute kernel is a function containing instructions declared in a program and executed on a processing core 128. This function is also referred to as a kernel, a shader, a shader program, or a program.

Figure 2:
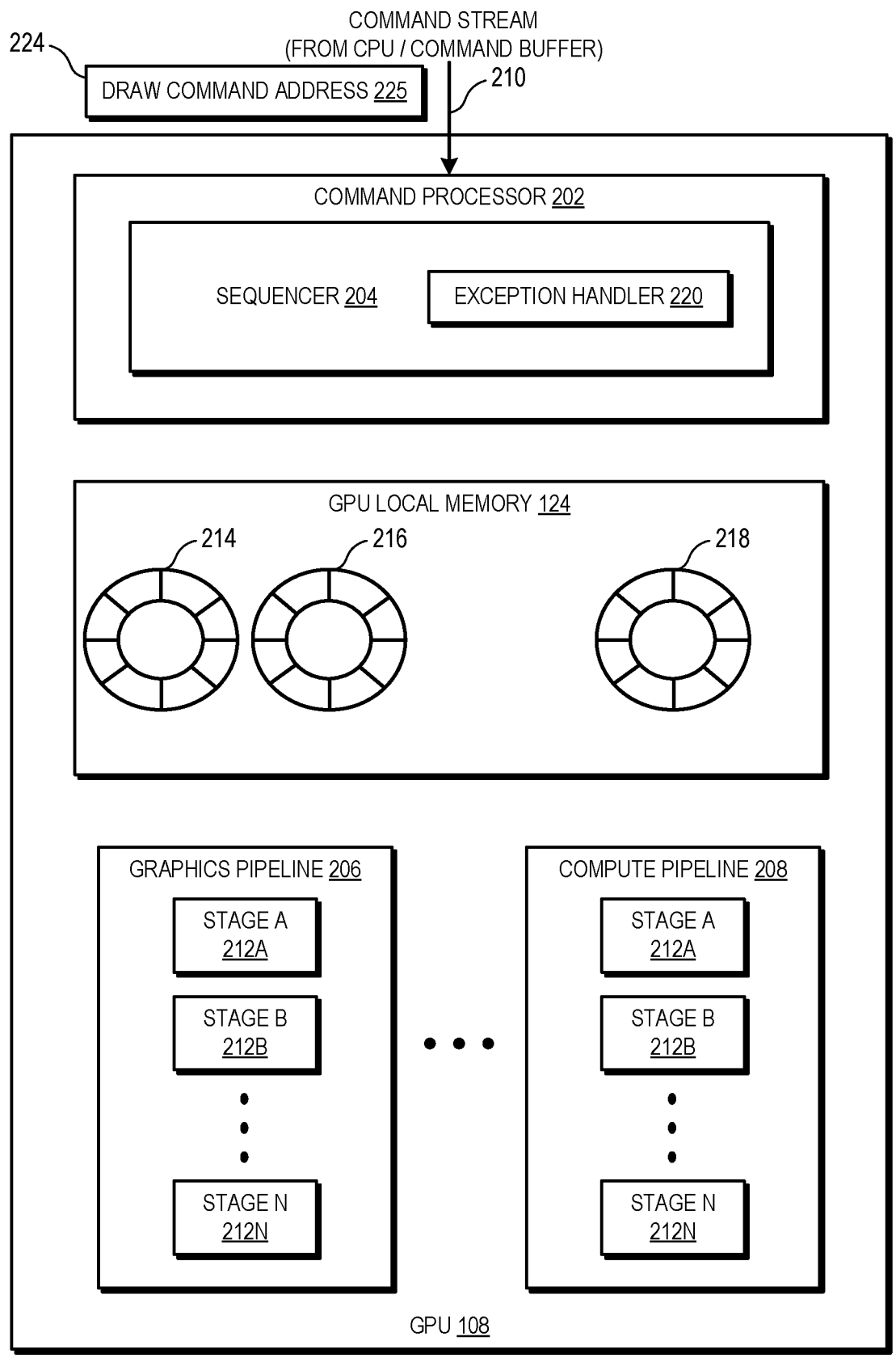
FIG. 2 is a block diagram illustrating a GPU for implementing wavefront exception handling in accordance with some embodiments.

In operation, and as described below in more detail with respect to FIG. 2, the GPU 108 includes an exception handler configured to receive an exception signal from the graphics pipeline 114 and in response thereof determine, based on the exception signal, an address of a command packet responsible for the occurrence of the pipeline exception. FIG. 2 is a block diagram illustrating a GPU for implementing wavefront exception handling in accordance with some embodiments. Those skilled in the art will recognize that the GPU 104 of FIG. 2 is an illustrative example only and is not intended to be limiting, as in different embodiments the described operations and structure are employed in any suitable apparatus. In the context of a GPU 104 as illustrated in this embodiment, the GPU 104 includes a command processor 202, a sequencer 204, the GPU local memory 124, and one or more graphics pipelines 114, such as a graphics pipeline 206 and a compute pipeline 208. Although the GPU local memory 124 is illustrated as being a part of the GPU 104, in other embodiments, the GPU local memory 124 is a separate memory unit from the GPU 104 or implemented at system memory 104 of FIG. 1.

The command processor 202 receives commands in a command stream 210 to be executed from the CPU 102 (e.g., via the command buffer and bus 112) and coordinates execution of those commands at the one or more graphics pipelines 114 of the GPU 108. As previously discussed with respect to FIG. 1, the CPU 102 sends instructions intended for GPU 108 to a command buffer. In different embodiments, the command buffer is located, for example, in system memory 104 is a separate memory coupled to bus 112. The command processor 202 is implemented as a reduced instruction set computer (RISC) engine with microcode for implementing logic including scheduling logic. In various embodiments, the command processor 202 is implemented in hardware, firmware, software, or a combination thereof. The command stream 210 includes one or more packets (e.g. packet 224) representing draw calls and/or dispatch commands. Each packet stores an address (e.g. draw command address 225) that identifies the corresponding draw call, dispatch command, or other operation.

In some embodiments, the command processor 202 stores, at a ring buffer of the GPU local memory 124 (e.g., ring buffers 214, 216, and 218), the address associated with a draw or dispatch submitted to the graphics pipeline 206. As noted above, the address associated with each draw or dispatch is a memory address indicating a memory location of the draw or dispatch command, and provides an identifier for the draw or dispatch command relative to other commands. The ring buffers 214, 216, and 218 are storage structures that each manage storage and retrieval of commands using two pointers: a write pointer and a read pointer. That is, each of the ring buffers 214, 216, and 218 is associated with its own corresponding write pointer and read pointer. The write pointer stores an address of (that is, points to) the location of the ring buffer where a command is stored and the read pointer points to the location of the ring buffer where a command is retrieved. As described further herein, the command processor 202 manipulates the values of the write pointer and read pointer for each ring buffer 214, 216, and 218 to write and read commands to the corresponding ring buffer.

As described further below, the command processor 202 processes a header of the command packet in the command stream 210 submitted to the GPU 108 to identify the address associated with the draw or dispatch command represented by the command packet The command processor 202 stores the address at the location of the ring buffer 214 pointed to by the write pointer and advances the write pointer of the ring buffer 214. In some embodiments, the command processor also stores the wavefront identifier for the wavefront generated based on the draw command. The command processor 202 advances the read pointer of the ring buffer 214 after wavefronts associated with each draw or dispatch complete processing through the graphics pipeline. In this manner, the command processor 202 performs fine level logging of draw and dispatch command addresses and allows the GPU 108, in the event of an exception/hang, to track which draw command created the fault.

In various embodiments, the command processor 202 manages multiple command buffers, keeps track of commands and work sent down into the GPU, and updates fences once the command stream has reached them. The command processor 202 also manages various dedicated fixed-function logic, a Vertex Assembler (VA), Tessellator, Geometry Assembler (GA), Rasterizer/Interpolator, other shader stages, and the like. Although illustrated in FIG. 2 as having one command processor 202, those skilled in the art will recognize that in other embodiments the GPU 108 includes any number and type of command processors for retrieving and executing packets from hardware queues. In various embodiments, a "packet" refers to a memory buffer encoding a single command. Different types of packets are stored in hardware queues, memory buffers, and the like. Additionally, as used herein, the term "block" refers to a processing module included in an ASIC, an execution pipeline of a CPU, and/or a graphics pipeline of a GPU. In different embodiments such a processing module includes, but is not limited to, an arithmetic logic unit, a multiply/divide unit, a floating point unit, a color buffer, a vertex shader, a pixel shader, a clipping unit, or some other processing module as would be apparent to a person skilled in the art.

In some embodiments, command processor 202 operations stall if all address slots in ring buffer 214 are currently occupied until storage is ready (e.g., after all paths of a pipe have completed processing, a done count is incremented and the tail read pointer 304 on the address storage at ring buffer 214 can be freed). Once the address has been stored, send the sideband signal per stream counter. On wave launch, the command processor 202 stores index from the current counter into an appropriate wave buffer location for later possible look up. For multi-draw packets, the address stored is the address of the calling packet.

As illustrated in FIG. 2, in this example, the command processor 202 includes a sequencer 204 (also referable to as an instruction scheduler) configured to manage the scheduling and executing of wavefronts at various processing cores (e.g., processor core 128 of FIG. 1). For example, in some embodiments, the sequencer 204 receives vertex vector data from a vertex grouper & tessellator (VGT, not shown for ease of illustration). The sequencer 204 manages vertex vector and pixel vector operations, vertex and pixel shader input data management, memory allocation for export resources, thread arbitration for multiple SIMD units 130 and resource types, control flow and ALU execution for the processing cores, shader and constant addressing and other control functions. Further, the sequencer 204 is the primary controller for a shader pipe interpolator (SPI, not shown for ease of illustration) and the various processing cores. Wavefronts are assigned through the sequencer 204, which generates threads from wavefronts and sequences these threads to be executed at the respective SIMD units 130.

The one or more graphics pipelines 114, such as the graphics pipeline 206 and the compute pipeline 208, include a number of stages 212, including stage A 212A, stage B 212B, and through stage N 212N. In various embodiments, the various stages 212 each represent a stage of the graphics pipeline 114 that executes various aspects of a draw call or a dispatch call. In various embodiments, the one or more graphics pipelines 114 include various fixed function stages and programmable shader stages. The fixed function stages and the programmable shader stages are configured to perform a designated function along the one or more graphics pipelines 114. In some embodiments, fixed function stages are implemented in hardware and are configured to perform a single dedicated function. Fixed function stages are conventional hardware implemented stages employed in traditional fixed function graphics pipelines.

In some embodiments, the programmable shader stages of the graphics pipeline 208 include processor modules programmed to perform specific functions. In one embodiment, the graphics pipeline 108 includes special purpose processors, referred to as shader processors that are well suited for highly parallel code and ill-suited for scalar code. The programmable shader stages are implemented as one or more shader programs that execute at the shader processors of the graphics pipeline 206 the. In some examples, shader processors are referred to as "shader units" or "unified shaders," and perform geometry, vertex, pixel, or other shading operations to render graphics.

In accordance with various aspects of the present disclosure, the command processor 202 receives commands from the command stream 210 and coordinates execution of those commands at the one or more graphics pipelines 114. The command processor 202 maintains one or more ring buffers (in this example shown as 214, 216 and 218) (or other similar circular queue/first-in-first-out FIFO buffer) for each of the one or more graphics pipelines 114 in memory, wherein each ring buffer that tracks the addresses of commands and packets processed by the command processor 202, depending on whether a pipeline handles dispatches, draws, or both.

The graphics pipeline 206 is capable of performing both compute (e.g., draws) and dispatches (also referred to as a game pipe), and the command processor 202 therefore maintains two separate ring buffers per graphics pipeline. Accordingly, as illustrated in FIG. 2, the command processor 202 stores command addresses into a first ring buffer 214 and a second ring buffer 216 for the graphics pipeline 206. The first ring buffer 214 stores address of draw commands submitted to the graphics pipeline 206. The second ring buffer 216 stores addresses of dispatch commands submitted to the graphics pipeline 206. The ring buffer 218 stores addresses of dispatch commands submitted to the compute pipeline 208. The compute pipeline 208 does not handle draw commands and therefore does not have a corresponding ring buffer for tracking draws. In other embodiments, the GPU 108 includes a pipeline being able to issue only draws (referred to as an OS pipe) and therefore is only associated with a single ring buffer of draws (in a manner similar to that of compute pipeline 208).

As described below in more detail with respect to FIG. 3, the command processor 202 stores, to the corresponding ring buffers 214 and 216, a virtual address associated with each command (draw command or a dispatch) issued by the command processor 202 for processing at the pipelines 114.

In various embodiments, when the command processor 202 processes the header of either a draw packet or a dispatch packet, the command processor 202 identifies the address of the location of the command buffer 119 where the draw packet or the dispatch packet is stored (i.e., the address from which the packet originated) and stores the identified address at the corresponding ring buffer 214, 26, and 218. In this manner, the command processor 202 logs the identifier of every draw command (or dispatch command) and its associated wavefront(s) submitted to the pipelines 114 for processing (herein referred to generally as the "draw dispatch identifier").

In other embodiments, and depending on how draw or dispatch commands are stored or identified at the processor 100. For example, in some embodiments draw or dispatch commands can be direct commands generated by the CPU 102, indirect commands generated by the GPU 108, commands that have embedded counts to identify how many times the command is to be executed, and the like. In these embodiments, the command processor 202 stores different information at the ring buffers 214, 216, and 218. For example, for commands including embedded counts, the command processor 202 stores the address of the command at multiple entries of the ring buffer 214 to match the embedded count.

Conventional GPUs generally do not track the sources of individual wavefronts. Accordingly, upon encountering an exception (e.g., error, crash, hang, faults, and the like), the GPU is merely aware of the occurrence of an exception but receives no insight as to the source of the exception. For example, in some scenarios multiple draws are sent down a graphics pipeline and any of those draws could be the cause of an exception. In contrast, the GPU 108 is configured to trace the source of exceptions back to the individual draw (or dispatch) command that created each individual wavefront.

To illustrate, and as described in more detail below with respect to FIG. 3, upon encountering an exception, a graphics pipeline 114 sends an exception signal to an exception handler 220 at the command processor 202 to request the draw dispatch identifier for the command that caused the exception. Although the exception handler 220 is illustrated in FIG. 2 as being implemented within the sequencer 204 of the GPU 108, in other embodiments the exception handler 220 is implemented at a different location within the GPU 108 in other embodiments without departing from the scope of this disclosure. The exception handler 220 includes the necessary logic to receive an exception signal and retrieve from the ring buffers 214, 216, and 218 the draw dispatch identifier for the draw or dispatch command that generated the exception.

Figure 3:
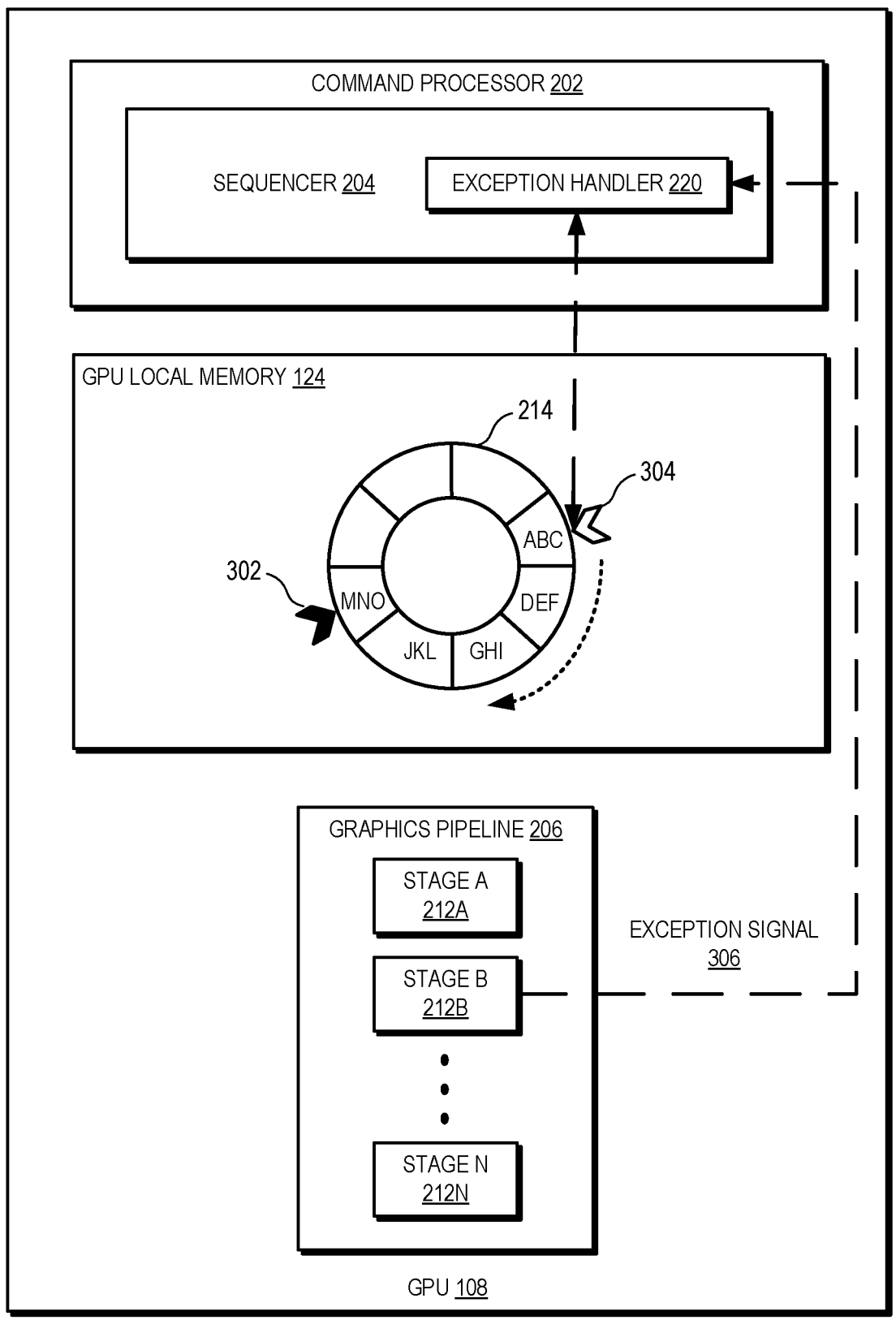
FIG. 3 is a block diagram illustrating exception handling by sampling of draw dispatch identifiers in accordance with some embodiments.

Referring now to FIG. 3, illustrated is a block diagram of exception handling operations by retrieving of draw dispatch identifiers in accordance with some embodiments. For ease of illustration, only portions of the GPU 108 are shown in FIG. 3. As illustrated, as the command processor 202 processes the header of draw packets (or dispatch packets in various embodiments), the command processor 202 writes the address of the location of the command buffer 119 that stores the draw (or dispatch) command and the corresponding wavefront identifier to ring buffer 214 in memory 124, and advances a write pointer 302 location with each write operation. Thus, the command processor 202 logs in memory 124, for every draw, the location and wavefront ID for the draw command.

Additionally, the command processor 202 also maintains a read pointer 304 for the ring buffer 214. The graphics pipeline 206 returns a done event for graphics (or EOP/EOS event back for compute) to advance the read pointer 304 as wavefront processing completes. Accordingly, from the command processor's perspective, the location of a read pointer 304 indicates which draw (or dispatch) for which the command processor 202 is currently waiting on a response. As the graphics pipeline 206 completes execution of a wavefront for a draw (or dispatch), the bottom of the pipe advances the read pointer 304 to a next slot and allows the previous slot (associated with the completed draw) to be reused.

In various embodiments, the shader stages are configured to determine the occurrence of a pipeline exception during execution of the graphics pipeline. As shown, the shader stage B 212B is configured to generate an exception signal 306 in response to, for example, an exception such as a hang or other graphics pipeline error. In various embodiments, the exception signal 306 is an output attribute of the shader stage 212B. Thus, unlike conventional programmable shader stages, the shader stage 212B is configured to recognize when a pipeline exception occurs, transfer control away from the graphics pipeline 206, and send the exception signal 306 to the exception handler 220. In various embodiments, any of the shader stages 212 are capable of determining the occurrence of a pipeline exception and sending an exception signal 306 to the exception handler 220.

In the event of exception handler 220 invocation (e.g., receipt of the exception signal 306 at the exception handler 220), the wavefront executing at the graphics pipeline 206 requests the command processor 202 to retrieve the draw or dispatch command identifier and wavefront identifier stored at the ring buffer 214 by issuing a read operation for the location of the ring buffer 214 pointed to by the read pointer 304. Thus, in the depicted example, the exception handler 220 determines that the wavefront which caused the fault originated from draw or dispatch command ABC. This identifier is reported back to, for example, the CPU 102 (or other location in system 100) for informing as to the source of the exception.

Figure 4:
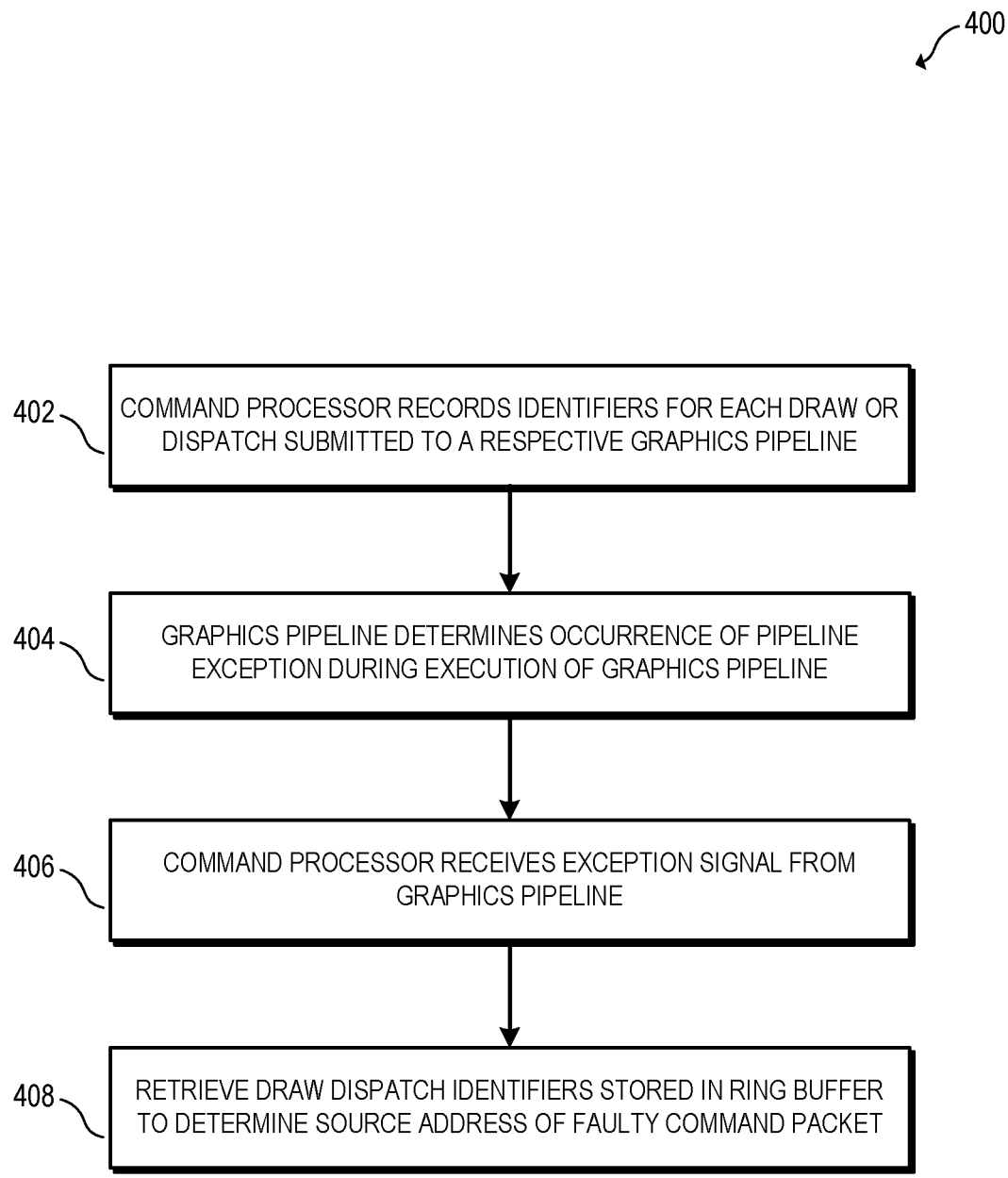
FIG. 4 illustrates a flow diagram of a method of operating a graphics pipeline and exception handling by sampling of draw dispatch identifiers in accordance with some embodiments.

FIG. 4 illustrates a flow diagram of a method 400 of operating a graphics pipeline and exception handling by sampling of draw dispatch identifiers in accordance with some embodiments. The graphics pipeline can be the graphics pipeline 119 of FIG. 1 or the graphics pipeline 220 of FIG. 2.

At block 402, the command processor stores an address for each draw or dispatch submitted to a respective pipeline. With reference to FIGS. 2-3, as the command processor 202 processes the header of draw packets (or dispatch packets in various embodiments), the command processor 202 writes out the command buffer address of the draw call (or dispatch) and associated wavefront identifier to ring buffer 214 in memory 124 and advances a write pointer 302 location with each operation. Thus, the command processor 202 logs in memory 124, for every draw, the location and ID of where that draw came from.

At block 404, the graphics pipeline determines the occurrence of a pipeline exception during execution of a wavefront. With reference to FIG. 3, the shader stage B 212B is configured to generate an exception signal 306 in response to, for example, an exception such as a hang or other graphics pipeline error and sends the exception signal 306 to the exception handler 220. A pipeline exception is a predefined condition associated with executing a portion of the work designated for the shader stages of the graphics pipeline 206. The pipeline exception can be, for example, a missing resource, a lack of memory space, missing data, divide by zero errors, hangs, faults, and the like In various embodiments, any of the shader stages 212 are capable of determining occurrence of a pipeline exception and sending an exception signal 306 to the exception handler 220.

At block 406, a command processor of a graphics processing unit (GPU) receives an exception signal indicating an occurrence of a pipeline exception. With reference to FIG. 3, the exception signal 306 is received at the exception handler 220. In the event of exception handler invocation (e.g., receipt of the exception signal 306 at the exception handler 220), at block 408, the executing wavefront requests index/address lookup to obtain from the ring buffers 214, 216, and 218 the identifier for the draw or dispatch command that caused the exception. In some embodiments, the identifier is reported to the CPU 102 (or other location in system 100) for to indicate the source of the pipeline exception.

In this manner, if a wavefront hangs and an application executing at the GPU 108 issues a shader exception, the wavefront error is traceable back to its source. By providing a read pointer to the ring buffer in memory, the exception handler is able to determine the address of the draw or dispatch which resulted in the wavefront error, thereby providing additional visibility into design and error reporting that would not normally be available in conventional GPUs.

A computer readable storage medium includes any non-transitory storage medium, or combination of non-transitory storage media, accessible by a computer system during use to provide instructions and/or data to the computer system. Such storage media can include, but is not limited to, optical media (e.g., compact disc (CD), digital versatile disc (DVD), Blu-Ray disc), magnetic media (e.g., floppy disc, magnetic tape, or magnetic hard drive), volatile memory (e.g., random access memory (RAM) or cache), non-volatile memory (e.g., read-only memory (ROM) or Flash memory), or microelectromechanical systems (MEMS)-based storage media. In some embodiments, the computer readable storage medium is embedded in the computing system (e.g., system RAM or ROM), fixedly attached to the computing system (e.g., a magnetic hard drive), removably attached to the computing system (e.g., an optical disc or Universal Serial Bus (USB)-based Flash memory), or coupled to the computer system via a wired or wireless network (e.g., network accessible storage (NAS)).

In some embodiments, certain aspects of the techniques described above are implemented by one or more processors of a processing system executing software. The software includes one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. A method, comprising:
   storing, for each draw or dispatch submitted to a graphics pipeline of a graphics processor, an address associated with the submitted draw or dispatch, each submitted draw or dispatch comprising one or more commands instructing the graphics processor to draw an object;
   receiving, at a command processor, an exception signal indicating an occurrence of a pipeline exception within the graphics pipeline; and
   determining, based on the exception signal and on the storing, an address of a command packet associated with the pipeline exception.

2. The method of claim 1, wherein receiving the exception signal comprises:
   receiving the exception signal at an exception handler of the command processor.

3. The method of claim 1, wherein:
   storing an address associated with each draw or dispatch submitted to the graphics pipeline comprises storing the associated address at a ring buffer.

4. The method of claim 3, further comprising:
   processing a header of the command packet in a command stream submitted to the graphics pipeline; and
   advancing, for each storing of the address associated with each draw or dispatch, a write pointer of the ring buffer.

5. The method of claim 3, further comprising:
   advancing a read pointer of the ring buffer after wavefronts associated with each draw or dispatch complete processing through the graphics pipeline.

6. The method of claim 1, wherein the command packet comprises a draw call.

7. The method of claim 1, wherein the command packet comprises a dispatch.

8. A system, comprising:
   a command processor, wherein the command processor is configured to:
   store one or more addresses associated with each draw or dispatch submitted to a graphics pipeline of a graphics processor, each submitted draw or dispatch including one or more commands instructing the graphics processor to draw an object;
   receive an exception signal indicating an occurrence of a pipeline exception at a shader stage of the graphics pipeline; and
   determine, based on the exception signal and on the stored one or more addresses, an address of a command packet associated with the pipeline exception.

9. The system of claim 8, further comprising:
   an exception handler at the command processor configured to receive the exception signal.

10. The system of claim 8, wherein the shader stage of the graphics pipeline is configured to generate the exception signal in response to the pipeline exception.

11. The system of claim 8, wherein:
    to store the one or more associated addresses includes to store, at a ring buffer, an address associated with each draw or dispatch submitted to the graphics pipeline.

12. The system of claim 11, wherein the command processor is further configured to:
    process a header of the command packet in a command stream received at the command processor; and
    advance, after storage of the address associated with each draw or dispatch, a write pointer of the ring buffer.

13. The system of claim 11, wherein the command processor is further configured to:
    advance a read pointer of the ring buffer after wavefronts associated with each draw or dispatch complete processing through the graphics pipeline.

14. The system of claim 11, wherein the command packet comprises a draw call and the command processor stores an address associated with the draw call at a first ring buffer.

15. The system of claim 14, wherein the command stream comprises a dispatch call and the command processor stores an address associated with the dispatch call at a second ring buffer separate from the first ring buffer.

16. A non-transitory computer readable medium embodying a set of executable instructions, the set of executable instructions to manipulate at least one processor to:
    store, for each draw or dispatch submitted to a graphics pipeline of a graphics processor, one or more addresses associated with the submitted draw or dispatch, each submitted draw or dispatch including one or more commands instructing the graphics processor to draw an object;
    receive an exception signal indicating an occurrence of a pipeline exception at a shader stage of the graphics pipeline; and
    determine, based on the exception signal and on the stored one or more associated addresses, an address of a command packet associated with the pipeline exception.

17. The non-transitory computer readable medium of claim 16, wherein:
    to store the one or more associated addresses includes to store, at a ring buffer, an address associated with each draw or dispatch submitted to the graphics pipeline.

18. The non-transitory computer readable medium of claim 17, the set of executable instructions to further manipulate at least one processor to:
    process a header of the command packet in a command stream received at a command processor; and
    advance, after storage of the address associated with each draw or dispatch, a write pointer of the ring buffer.

19. The non-transitory computer readable medium of claim 17, the set of executable instructions to further manipulate at least one processor to:
 advance a read pointer of the ring buffer after wavefronts associated with each draw or dispatch complete processing through the graphics pipeline.

20. The non-transitory computer readable medium of claim 16, wherein the command packet comprises a draw call and a command processor stores an address associated with the draw call at a first ring buffer.

* * * * *